May 22, 1951 T. S. MAYNER 2,554,468
THREAD-ADVANCING REEL
Filed Sept. 15, 1948
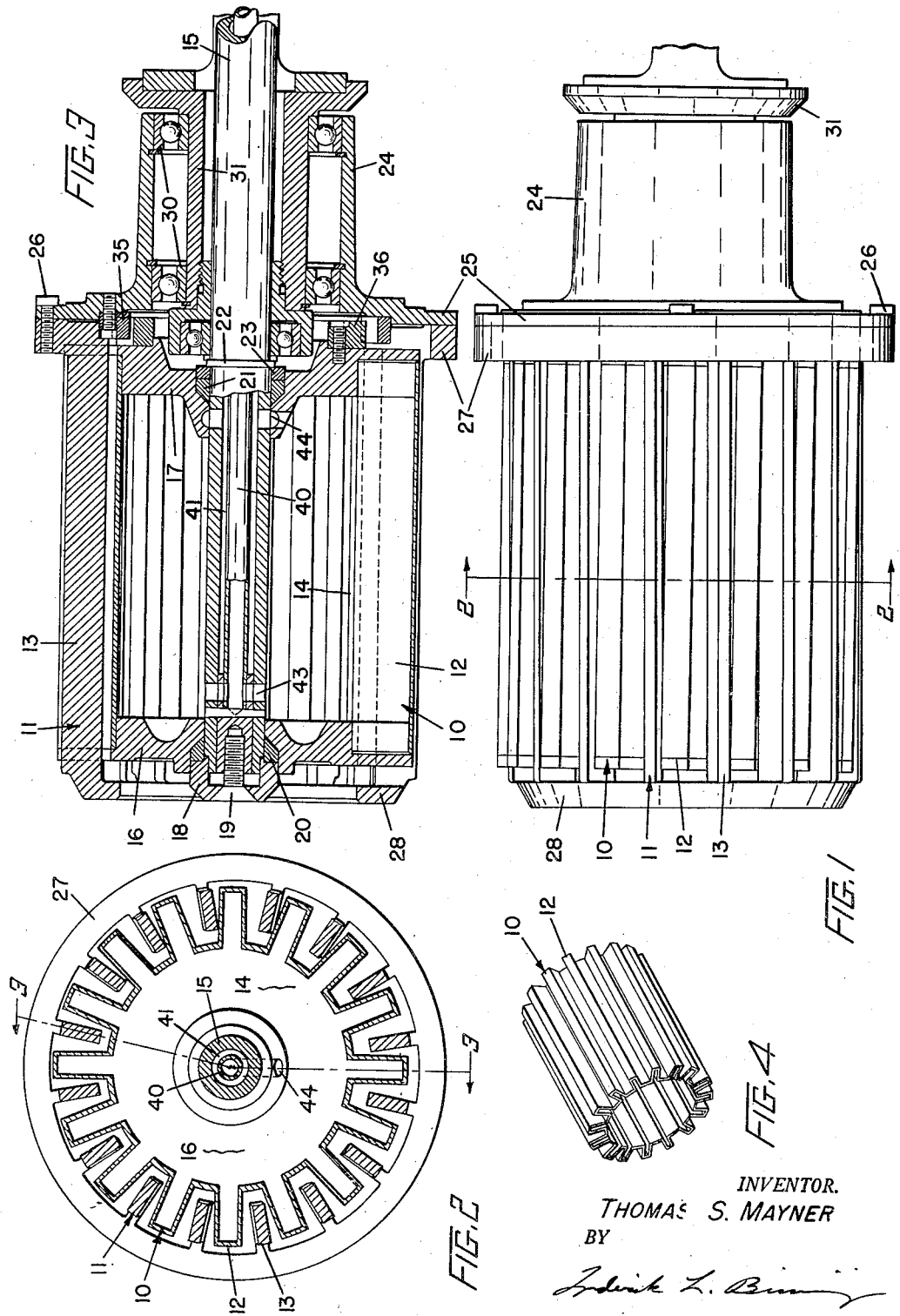
INVENTOR.
THOMAS S. MAYNER
BY Patented May 22, 1951

2,554,468

UNITED STATES PATENT OFFICE 2,554,468

THREAD-ADVANCING REEL

Thomas S. Mayner, Chagrin Harbor, Willoughby Township, Lake County, Ohio, assignor to Industrial Rayon Corporation, Cleveland, Ohio, a corporation of Delaware Application September 15, 1948, Serial No. 49,341

3 Claims. (Cl. 34—153)

This invention relates to heated thread-advancing reels. More particularly the invention relates to bar type reels through which a heating fluid is circulated and which are adapted to store and advance thread in a helical manner.

Bar type thread-advancing thread-drying reels are utilized in various rayon spinning processes for heating and drying thread, the heat being supplied from an exterior means or from within the reel or a heating medium may be circulated through the interior of a reel. From an economy and safety standpoint, it has been found more advantageous to circulate a heating fluid through the interior of the reel, the heat being transmitted to the thread-bearing surface of the reel by the material of which the reel is made. Such a reel, for example, is shown in the Corey Patent No. 2,413,217.

Generally, where the heating fluid is circulated through an enclosed reel interior, there is some lag and some heat loss where the heat must be transferred through a solid thread-bearing bar. Under circumstances where a reel is operating at elevated temperatures and where a steady and a substantially immediately constant heat transfer to the thread is desired, the distance through which heat must travel desirably should be minimized for most efficient operation. Also, where the entire reel is heated by the circulation of a heating medium through only one of the reel members, the capacity and design of such reel member desirably should be such as to quickly and sufficiently heat the other reel member to substantially the temperature of the first.

This invention advantageously provides for a heated thread-advancing reel having a modified hollow reel member through which a heating fluid circulates that is adapted to provide for a more rapid and a more uniform transfer of heat to the reel exterior. Advantageously the bars of the hollow reel member are made open lengthwise to the hollow reel member interior. The heat transfer through such a reel member is substantially instantaneous since the conducting distance is only that necessary to provide for structural strength in the reel design. Further, the interiorly open thread-bearing bars of the heated reel member provide a three-sided heat radiating surface which substantially encompasses the bars of the other reel member.

The advantages of such a thread-drying reel construction will be apparent from the following specification in conjunction with the attached drawing where:

Figure 1 represents a side elevation of a thread-advancing thread-storing reel;

Figure 2 is a cross-section of the reel of Figure 1 taken along lines 2—2;

Figure 3 is a section of the reel of Figure 1 taken along lines 3—3 of Figure 3; and Figure 4 is an isometric representation of the hollow reel member through which the heating medium circulates.

The invention advantageously relates to the type of reel disclosed in the Corey Patent No. 2,413,217 which shows a reel comprising two reel members rotatably mounted on axes that are offset and askew. A rotation of the reel effects cooperation between the reel members so as to advance thread in a plurality of generally helical turns.

Referring to the drawing the reel comprises reel members 10 and 11 each having a periphery of a plurality of bar members 12 and 13 respectively arranged in an interdigitating relation. The reel advantageously is of cantilever type so as to present an unobstructed end for the discharge of thread therefrom, as well as for providing a structure which is adaptable to the construction of a chamber within it for the circulation of a heating medium therethrough. The reel member 10 is concentrically positioned about the reel shaft 15 and it is supported thereon by the end closures 16 and 17 which with the closed periphery of the reel member 10 form a fluid-tight chamber 14.

The end closure 16 of the reel member 10 seals the front end of the reel as well as a seal about the reel shaft 15. A cap 18 is drawn into engagement with a pliable packing material 20 by a screw 19 threaded into the solid end of the reel shaft 15 the packing being positioned about the shaft within a conical recess of the end closure 16. The packing 20 seals and binds the end closure 16 to the shaft 15. In a somewhat similar manner the rear end closure 17 is made fluid tight. Upon a tightening of the screw 19 a pliable packing 21 contained in a conical recess in the end closure 17 is also forced against a ring 23 abutting a collar 22 on the shaft 15. The end closure 17 is thus also sealed against the reel shaft and bound thereto. The reel member 10 as a result of the compound packing material is frictionally bound to the shaft and rotates therewith.

Reel member 11 is rotatably supported by the hub 24 having a flanged portion 25 which is fastened by screws 26 to a flanged portion 27 into which merge the bar members 13 of the reel member 11. At the forward end of the reel member 11 the bar members are reinforced against compression by a ring 28. Further, the hub is adapted to rotate on spaced bearings 30 mounted about a stationary eccentric sleeve 31. The axis of the eccentric sleeve 31 is offset and askew to the axis of the reel shaft giving a relationship between the reel members 10 and 11 that effects an advance of thread on the reel in a helical manner. The reel shaft 15 extends through the sleeve 31 to a drive source (not shown).

Bar to bar contact for purposes of driving the eccentric reel member 11 is avoided by the provision of an annular gear 35 and an internal gear 36. The internal gear 36 is attached to the concentric reel member 10 while the annular gear is attached to the reel member 11. Upon rotation of the shaft 15 the reel member 10 is rotated and drives reel member 11 through the gear 35, 36.

A heating medium, such as hot water or steam, is supplied to the reel member 10 through a tube 40 in the core of the shaft 15 and is exhausted from the reel member through an annular conduit formed by tube 40 and the shaft 15. In the example shown in Figure 3 a heating fluid is adapted to flow through core 40 into the chamber 14 and it is exhausted from the chamber through the annular exhaust 41. The tube 40 is connected to the interior 14 of the reel member 10 by the inlet 43 and the chamber is exhausted through the outlet 44 which connects the interior 14 with the exhaust conduit 41.

A substantially immediate transfer of heat to the thread on the reel is possible by the construction of the reel member 10. The bar members 12 of the reel member 10 are made hollow substantially throughout their lengths, their inner open portions facing the interior of the reel member. The construction of the reel periphery advantageously can be similar to that shown in Figure 4. A heating fluid is adapted to circulate in the core and throughout the length of each of the hollow bar members 12 which form the periphery of the reel member 10. Because of the relatively thin construction of the hollow reel member, heat is transferred substantially immediately to the thread on a reel surface. Also, because the second set of bar members 13 are substantially fully enclosed by heat radiating surfaces of the hollow bar member 12, the entire reel periphery is substantially uniformly heated.

I claim:

1. A thread-advancing reel comprising two reel members one of which is eccentrically mounted relative to the other having peripheries of a plurality of circumferentially spaced interdigitating longitudinally extending bar members the cooperation of which upon rotation of the reel is adapted to advance thread lengthwise of the reel in the form of a helix, one of said reel members having a hollow core with hollow bar members open lengthwise to said core, said hollow-cored reel member being adapted to receive a heating medium for circulation therethrough, and means for supplying and circulating a heating fluid through said hollow reel member.

2. A thread-advancing reel comprising at least two reel members one of which is eccentrically mounted relative to the other having peripheries of circumferentially spaced longitudinally extending bar members arranged in an interdigitating relation and which upon rotation of the reel advance thread in the form of a helix, one of said reel members having a hollow enclosed interior and hollow bar members opening substantially throughout their lengths into the hollow reel interior, and means for supplying and circulating a heating fluid through said hollow reel member.

3. A thread-advancing reel comprising at least two reel members one of which is eccentrically mounted relative to the other and each having a periphery of circumferentially spaced longitudinally extending bar members, the bar members of both reel members arranged in an interdigitating relation and upon rotation the reel members cooperate to advance thread in the form of a helix, one of said reel members being of hollow one-piece construction the bar members being formed of raised portions opening lengthwise to the hollow interior of the reel member, end closures for said hollow reel member, and means for supplying and circulating a heating fluid through said hollow reel member.

THOMAS S. MAYNER.

REFERENCES CITED

The following references are of record in the file of this patent:

UNITED STATES PATENTS

| Number | Name | Date |
| --- | --- | --- |
| 1,820,621 | Junkers | Aug. 25, 1931 |
| 1,983,221 | Furness | Dec. 4, 1934 |
| 2,456,925 | Corey et al. | Dec. 21, 1948 |